United States Patent [19]

Murano et al.

[11] 4,305,107

[45] Dec. 8, 1981

[54] DC INTERRUPTING APPARATUS

[75] Inventors: Minoru Murano, Tokyo; Satoru Yanabu, Machida; Tohru Tamagawa, Chigasaki; Hisatoshi Ikeda, Zushi, all of Japan

[73] Assignee: Tokyo Shibaura Denki Kabushiki Kaisha, Kawasaki, Japan

[21] Appl. No.: 67,136

[22] Filed: Aug. 16, 1979

[30] Foreign Application Priority Data

Sep. 2, 1977 [JP] Japan .................. 52-105422

[51] Int. Cl.³ .............................................. H02H 7/26
[52] U.S. Cl. ................................................... 361/4
[58] Field of Search ........................................ 361/2-9, 361/56, 91, 110, 111, 159

[56] References Cited

U.S. PATENT DOCUMENTS 3,475,620  10/1969  Murray et al. .................. 361/4
3,970,810  7/1976  Carroll et al. .................. 361/3 X

OTHER PUBLICATIONS

General Electric Transient Voltage Suppression Manual, ©1976, p. 3.

Primary Examiner—Harry E. Moose, Jr.
Attorney, Agent, or Firm—Oblon, Fisher, Spivak, McClelland & Maier

[57] ABSTRACT

A DC interrupter unit as provided between a DC power source unit and a load unit. The DC interrupter unit includes a DC interrupter section having at least one interrupter to interrupt a DC current and a saturable reactor connected between the interrupter section and one terminal of the load unit. The interrupter unit further includes a series circuit having a resistor and capacitor in series, the series circuit being connected between the junction of the interrupter section and the saturable reactor and the other terminal of the load unit.

8 Claims, 8 Drawing Figures

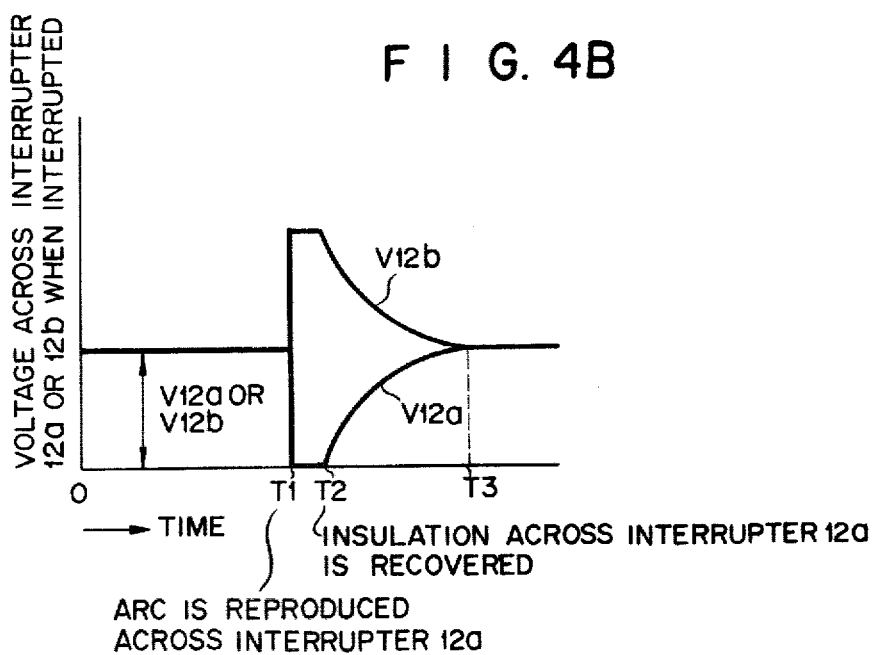
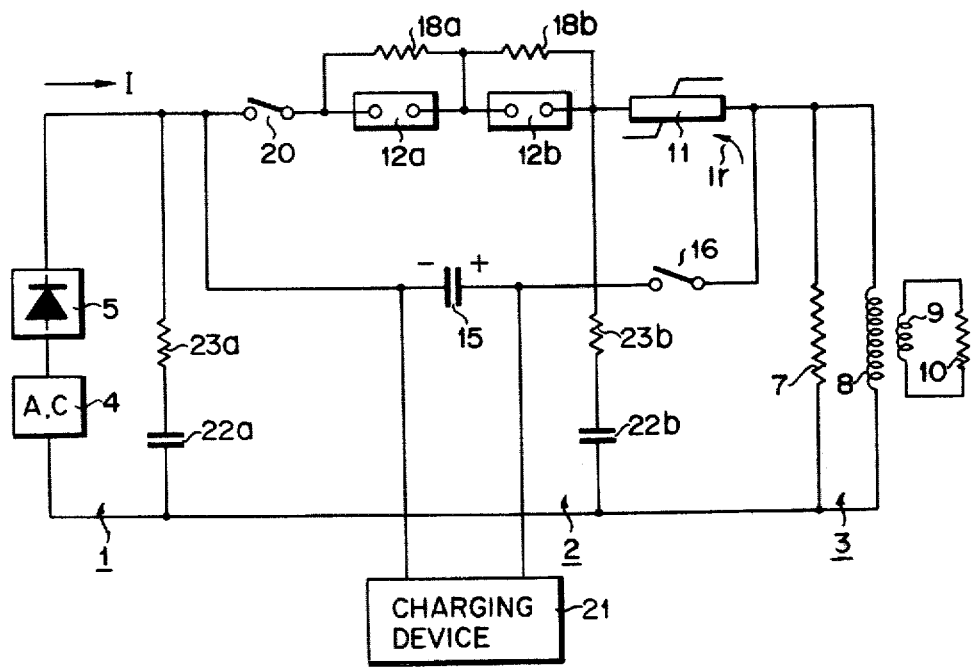

DC INTERRUPTING APPARATUS

BACKGROUND OF THE INVENTION

The present invention relates to a DC interrupting apparatus having a DC power source unit, a DC interrupter unit, and a load unit and, more particularly, a DC interrupting apparatus for preventing surge voltage from being propagated from a DC power source unit to a load unit and vice versa.

For a better understanding of the present invention, some problems involved in the conventional DC interrupting apparatus will be described with reference to FIGS. 1 and 2. FIG. 1 shows a conceptional view of a conventional interrupting apparatus for transmitting electric energy from a DC power source unit 1 to a load unit 3, through a DC interrupter unit 2. A DC current I fed from a DC power source unit 1 including an AC power source 4 and a rectifier 5 is supplied to the load unit 3, through an interrupter 6, for example, a vacuum interrupter. The load unit 3 is comprised of a resistor 7, an inductance coil 8 with a low resistance connected across the resistor 7, an inductance coil 9 magnetically coupled with the inductance coil 8, and a resistor 10 connected in series with the inductance coil 9 and consuming energy. When a DC current I is rapidly interrupted by the interrupter 6, a current flowing through the inductance coil 8 flows into the resistor 7. The current flowing through the resistor 7 attenuates in accordance with a time constant determined by an inductance of the inductance coil 8 and the resistor 7. The energy produced by a change of the current is propagated to the inductance coil 9 so that energy is supplied to the load 10. For the energy supply, a large current at a high voltage must be interrupted by the interrupter 6. To this end, usually, a plurality of interrupters are connected in series in the interrupter unit 2. Alternately, a plurality of groups each including a plurality of interrupters connected in series are connected in parallel. Because of the interruption of a large current, a steep surge voltage is frequently produced in the DC power source unit 1 and the load unit 3. Such a surge voltage is preferably absorbed in a unit at which the surge voltage is produced so as not to be transmitted to other units.

FIG. 2 shows a circuit diagram of a interrupter unit inserted between points A and B shown in FIG. 1. Inserted between the points A and B, a saturable reactor 11, a first interrupter 12a, a second interrupter 12b in series fashion. A series circuit including a capacitor 13a and a resistor 14a is connected across the interrupter 12a. Another series circuit having a capacitor 13b and a resistor 14b is connected across the interrupter 12b. Those series circuits are provided to absorb transient voltages applied across the interrupters 12a and 12b. Between the points A and B, a series circuit including a capacitor 15 and a normally opened switch 16 is connected and the capacitor 15 is previously charged by a charging device 17 to have polarities as shown.

In the interrupter unit shown in FIG. 2, when the DC current I is interrupted, the interrupters 12a and 12b are simultaneously opened to produce arcs across the respective interrupters. After a predetermined time lapse since these interrupters are begun to open, the switch 16 is closed and the capacitor 15 is discharged through the interrupters 12a and 12b and the saturable reactor 11. The discharging current is denoted as Ir (commutation current). When Ir>I, a zero point occurs in a current flowing through the interrupters 12a and 12b. At the time that the zero point occurs, the current I is interrupted. In order that the interrupters 12a and 12b may easily interrupt the current I, it is desirable that the inclination (a changing rate of current) of a current flowing through the interrupters immediately before the current flowing through the interrupters becomes zero is small, and that a rate of increase of the voltage (recovery voltage) applied between the electrodes of each interrupters after the current is interrupted, is small. The saturable reactor 11 serves to make the inclination of the current small. That is, after the current is interrupted, the current flows through the saturable reactor is extremely small so that the reactor serves as a large inductance.

In FIG. 2, after a current flowing through the interrupters 12a and 12b is interrupted, an oscillating voltage is applied across terminals of respective interrupters for a relatively long time. As a result, after the DC current is interrupted and the time of several hundreds milliseconds is lapsed, the interrupter 12a, for example, is refired, while the interrupter 12b is not refired. At this time, the entire of the oscillating voltage is applied as an excessive voltage across the interrupter 12b. As a result, there possibly occurs a situation where the interruption is impossible in worst case.

During the period from the instance that an excessive voltage is applied across an interrupter until the interrupter is refired, much time is required. The time taken for the interrupter to be refired depends on the extinguish medium or the amplitude of the excessive voltage. This time may be several tens milliseconds or more in a vacuum interrupter. Within this several tens milliseconds, the insulation of the interrupter 12a first refired is recovered. With respect to the excessive voltage applied across the interrupter 12b, however, since charges stored in the capacitor 13b are not rapidly discharged, the excessive voltage applied to the interrupter 12b when the interrupter 12a is refired is continuously applied across the interrupter 12b. On the other hand, no voltage is applied across the interrupter 12a even if the insulation is recovered. Accordingly, when the interrupter 12a is insulation-recovered following the refiring, it is desirable that a part of an excessive voltage having been applied across the interrupter 12b is shifted to the terminals across the interrupter 12a and that the voltage applied across the interrupters 12a and 12b are equalized as rapidly as possible. A case where the interrupters 12a and 12b are connected in series has been described. When the number of the series-connected interrupters increases, the problems relating to the refiring, the insulation recovery and an excessive voltage being applied across an interrupter are more complicated.

The interrupter unit shown in FIG. 2 has additional following problems. A steep surge voltage occurring in the power source unit is propagated to the load unit, through the capacitors 13a and 13b. A steep surge voltage occurring in the load unit is likewise propagated to the DC power source unit. As a result, the performance of a DC interrupting apparatus may possibly be deteriorated.

In order to equalize the recovery voltage being applied across each of the interrupters 12a and 12b as rapidly as possible, it is conceivable that the resistors 18a and 18b are connected across the interrupters 12a and 12b, respectively, as shown in FIG. 3. In FIG. 4A, there is shown a relation between a voltage value (a relative value) applied across each interrupter in FIG. 2 and the lapse of time. Further, FIG. 4B shows a relationship between a voltage value (a relative value) applied across each interrupter shown in FIG. 3 and the lapse of time. In the figures, an original "0" of time represents a time point immediately after the DC current is shut off. At the time point "0", the interrupters 12a and 12b are both supplied with recovery voltages. At the time T1, for example, if the interrupter 12a is refired and the interrupter 12b is not refired, a recovery voltage is applied fully across the interrupter 12b as shown by V12b and no part of the recovery voltage is applied across the interrupter 12a as shown by V12a (FIGS. 4A and 4B). In FIG. 2, i.e. FIG. 4A, the capacitor 13b holds charges for a relatively long time. Accordingly, even if the insulation of the interrupter 12a is recovered, the voltage V12b across the interrupter 12b is held as it is, as shown in the figure. In FIG. 3, i.e. FIG. 4B, the interrupter 12a is refired at time T1 and, at time T2, is insulation-recovered, the charge in the capacitor 13b of the interrupter 12b is discharged so that the voltage across the interrupter 12b becomes V1 at the time T3. With this, the voltage across the interrupter 12a becomes V1 at time T3. In this case, it is desirable that the time constant of the circuit including the capacitor 13a and resistors 14a and 18a and that of the circuit including the capacitor 13b and the resistors 14b and 18b are small. When the capacities of the capacitors 13a and 13b are small, however, it is difficult to decrease the rising rate of a recovery voltage which is applied to respective interrupter after DC current interruption. Also, it is difficult to make the resistance of each resistor small in the light of the heat capacity of each resistor. Further, the FIG. 3 circuit can not prevent a surge voltage produced at the power source unit from being propagated to the load unit and the surge voltage produced at the load unit from being propagated to the power source unit.

Accordingly, an object of the present invention is to provide a DC interrupting apparatus which can prevent a surge voltage produced at the DC power source unit from being propagated to the load unit and a surge voltage produced at the load unit from being propagated to the power source unit.

Another object of the invention is to provide a DC interrupting apparatus which may shorten the time necessary to distribute a recovery voltage over series connected interrupters in an equal value.

SUMMARY OF THE INVENTION

According to the invention, there is provided a DC interrupting apparatus having a DC interrupter unit connected between a DC power source unit and a load unit, in which the DC interrupter unit comprises: a DC interrupter section including at least one DC interrupter to interrupt a DC current supplied from the DC power source unit to the load unit; and at least one saturable reactor connected between the DC interrupter section and one terminal of the load unit; and a series circuit having a resistor and capacitor in series and connected between the connection point of the interrupter section and the saturable reactor and the other terminal of the load unit.

Other objects and features of the invention will be apparent from the following description taken in connection with the accompanying drawings, in which:

BRIEF DESCRIPTION OF THE DRAWINGS

FIG. 4B shows recovery voltages shared by the interrupters shown in FIG. 3 after a DC current is interrupted by the interrupters;

FIG. 5 shows a circuit diagram of an embodiment of a DC interrupting apparatus according to the invention;

DETAILED DESCRIPTION OF THE PREFERRED EMBODIMENTS

Figure 1:
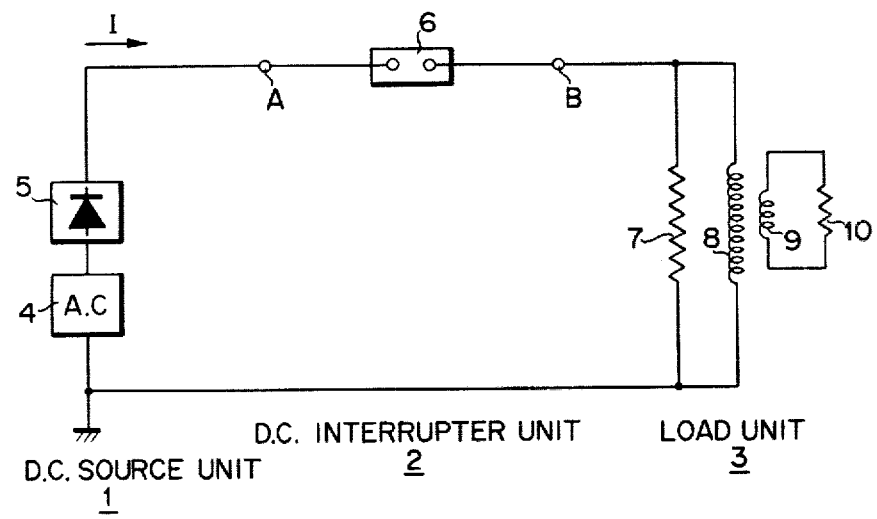
FIG. 1 shows a conceptional view of a conventional DC interrupting apparatus.
Figure 2:
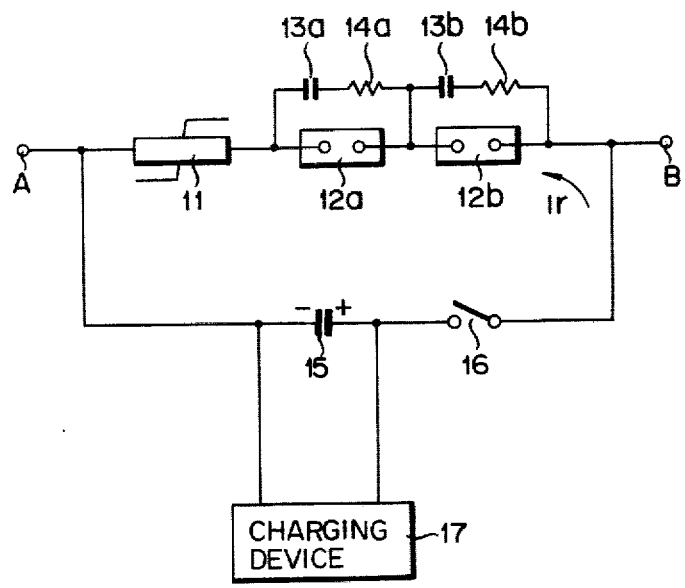
FIG. 2 shows a circuit diagram of a conventional DC interrupter unit used in the circuit section shown in FIG. 1.
Figure 3:
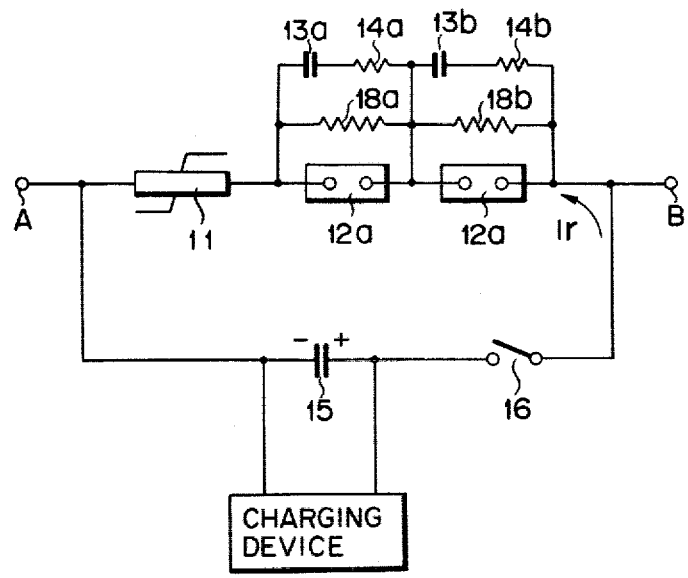
FIG. 3 shows a circuit diagram for illustrating a part of the improvement of the circuit shown in FIG. 2.
Figure 4A:
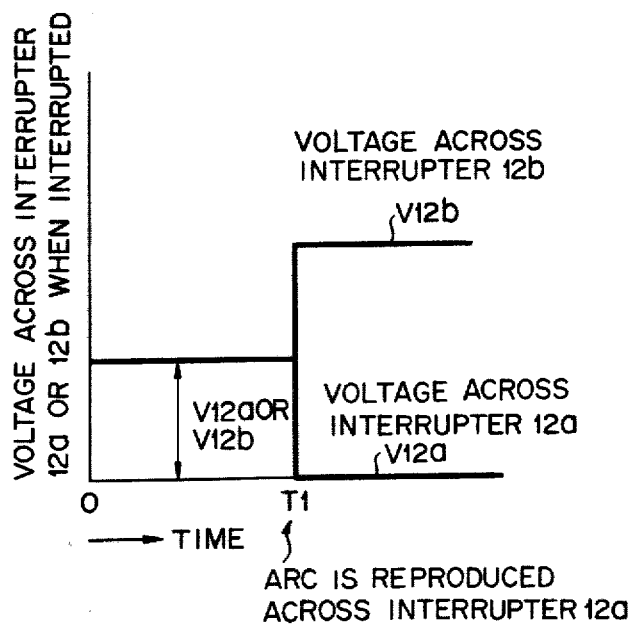
FIG. 4A shows recovery voltages shared by the interrupters shown in FIG. 2 after a DC current is interrupted by the interrupters.

In the respective embodiments, like reference symbols in FIGS. 1 and 3 will be used to designate like or equivalent parts or portions, for simplicity of explanation. In FIG. 5, a DC interrupter unit 2 coupled between a DC power source unit 1 and a load unit 3 has the following construction. Inserted between the positive terminal of a rectifier 5 and one of the terminals of the load unit 3 are a normally closed switch 20, a first interrupter 12a, a second interrupter 12b, and a saturable reactor 11 in series in this order. As previously described referring to FIG. 2, one end of a series circuit including a normally opened switch 16 and a commutation capacitor 15 previously charged by the charging device 21 as shown in the polarity, is connected to the positive terminal of the power source unit. The other end of the series circuits is connected to the connection point of the load unit and the saturable reactor 11. Resistors 18a and 18b are connected across the interrupters 18a and 18b, respectively. A first series circuit having a capacitor 22a and a resistor 23a is connected across the power source unit. A second series circuit having a capacitor 22b and a resistor 23b is connected between the connection point between the interrupter 12b and the saturable reactor 11, and the ground. One of these series circuits may be omitted.

In the embodiment shown in FIG. 5, when the DC current I is interrupted, the electrodes of the interrupters 12a and 12b are simultaneously opened to produce arcs between each pair of electrodes. After the electrodes of the interrupter are begun to open and a given time is lapsed, the switch 16 is closed. At this time, the capacitor 15 has already been charged with the polarity as shown, a current Ir flows through the interrupters in the direction opposite to that of the DC current I. If Ir>I, a zero point is formed in the current flowing through the interrupters 12a and 12b. After a given time following the openings of the interrupters 12a and 12b, the normally closed switch 20 is opened. More precisely, the switch 20 is opened at a time point that the zero point is formed in the current flowing through the interrupters 12a and 12b. The given time is determined depending on the circuit condition.

Also in this embodiment, it is assumed that after the interrupters 12a and 12b interrupted the DC current, one of these interrupters, for example, 12a is refired and the entire of a recovery voltage is applied across the interrupter 12b, and that the interrupter 12a is insulation-recovered. Since the components connected across the interrupters 12a and 12b, respectively, are resistors 18a and 18b and not the capacitors (13a and 13b in FIG. 2), immediately after the refired interrupter 12a is insulation-recovered, recovery voltages applied across the interrupters 12a and 12b are equalized. Further, the first series circuit including a capacitor 22a and a resistor 23a absorbs a steep surge voltage produced in the power source unit. The second series circuit including a capacitor 22b and a resistor 23b absorbs a steep surge voltage produced in the load unit. Because of the presence of these series circuits, the propagation of a surge voltage from the power source unit to the load unit or form the load unit to the power source unit is prevented. The propagation of the surge voltage may be substantially prevented even if the switch 20 is not provided. However, the provision of the switch 20 more reliably prevents the surge voltage propagation. The first and the second series circuits cooperate with the saturable reactor 11 to decrease the rising rate of a recovery voltage applied across each of the interrupters 12a and 12b after the DC current is shut off. In sometimes, after the interrupters 12a and 12b shut off the DC current, both interrupters are refired. In such case, it is impossible to interrupt the DC current. The switch 20 prevents such a situation.

Figure 6:
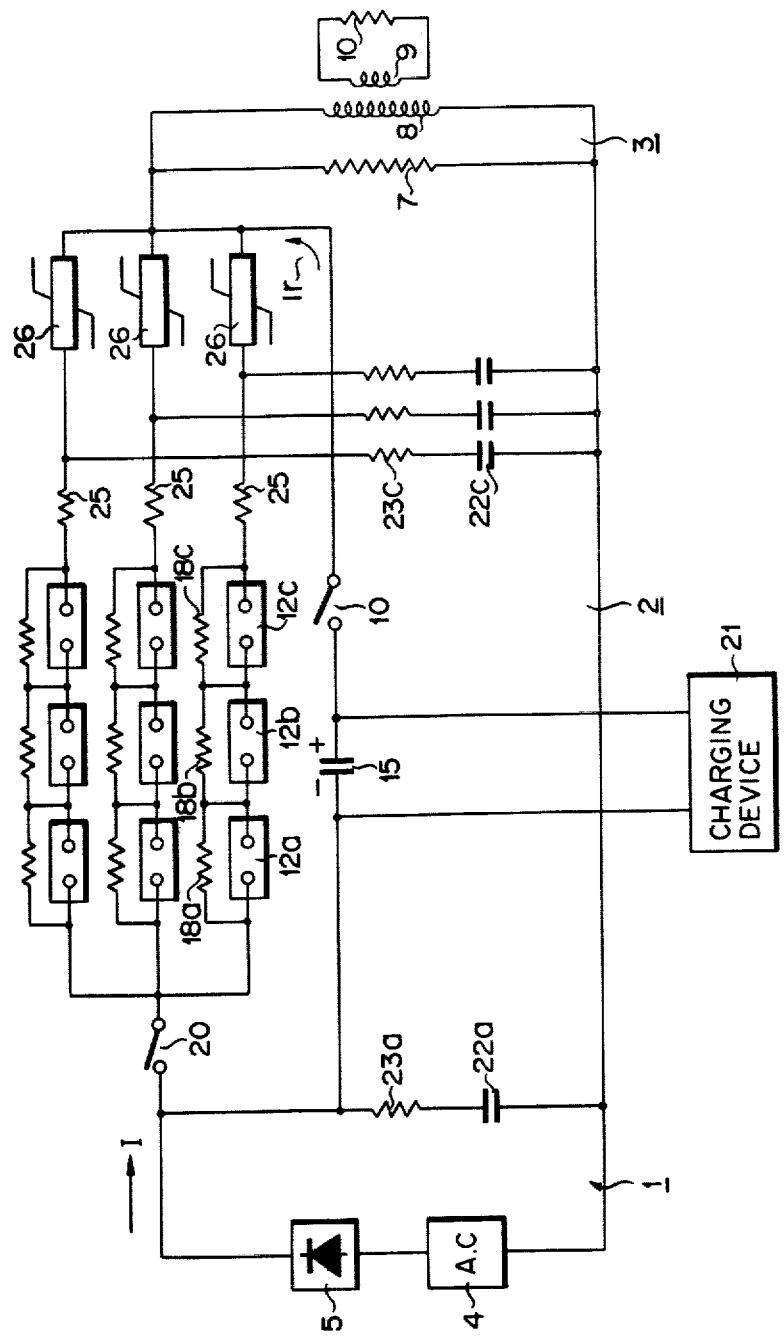
FIG. 6 shows a circuit diagram of another embodiment of a DC interrupting apparatus according to the invention.

In an embodiment shown in FIG. 6, three series circuits each including interrupters 12a, 12b and 12c, a branch resistor 25, and a saturable reactor 26 are connected in parallel between the switch 20 and the load unit 3. Three series circuits each including a capacitor 22c and a resistor 23c are connected in parallel between ground and the connection points between the saturable reactors 26 and the branch resistors 25. A series circuit including a capacitor 22a and a resistor 23a is connected across the power source unit, as like the embodiment shown in FIG. 5. Three series circuits each including the capacitor 22c and the resistor 23c, and the saturable reactor 26 are provided to prevent an interference at the time of the DC current interruption. The branch resistor 25 is provided to equalize the current flowing through the series-interrupter groups. The operation and the effects of the embodiment shown in FIG. 6 are the same as those of the embodiment of FIG. 5. Therefore, explanation of those will be omitted.

Figure 7:
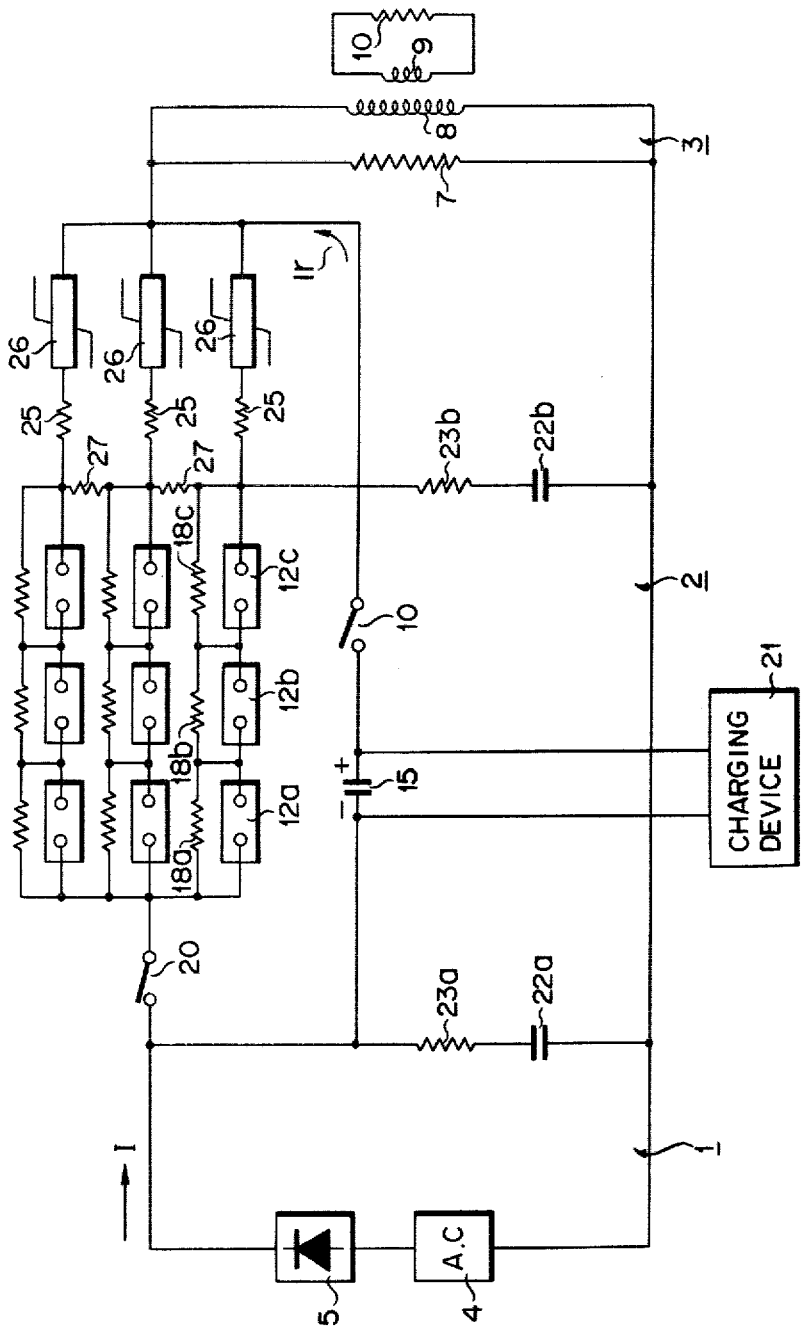
FIG. 7 shows a circuit diagram of still another embodiment of a DC interrupting apparatus according to the invention.

An embodiment shown in FIG. 7 uses a single series circuit having a capacitor 22b and a resistor 23b in place of three series circuit each including the capacitor 22c and the resistor 23c. In this embodiment, resistors 27 are further used each to separate the adjacent series-interrupter groups, as shown. The operation and the effects of the embodiment is the same as those of the embodiment shown in FIG. 5. Therefore, explanation of those will be omitted.

What we claim is:

1. A DC interrupting apparatus having a DC interrupter unit connected between a DC power source unit and a load unit, wherein said interrupter unit comprises:
   a DC interrupter section including at least one DC interrupter to interrupt a DC current for supplying DC current from said DC power source unit to said load unit; and
   at least one saturable reactor connected between said DC interrupter section and one terminal of said load unit;
   a series circuit having a resistor and capacitor in series and connected between the connection point of said interrupter section and said saturable reactor and the other terminal of said load unit.

2. A DC interrupting apparatus according to claim 1, in which said DC interrupter unit includes a capacitor which is coupled with said DC interrupter section and feeds into said interrupter section a current flowing in an opposite direction to that of a DC load current to said load unit when the load current is interrupted by said interrupter section.

3. A DC interrupting apparatus according to claim 1, wherein said DC interrupter further comprises another series circuit having a resistor and capacitor in series and connected across said DC power source unit.

4. A DC interrupting apparatus according to claim 1, in which said DC interrupter section includes a plurality of interrupters connected in series, each interrupter having a resistor connected thereacross.

5. A DC interrupting apparatus according to claim 1, in which said DC interrupter section is comprised of a plurality of groups each including a plurality of interrupters connected in series, each interrupter having a resistor connected thereacross.

6. A DC interrupting apparatus according to claim 5, in which a saturable reactor is connected between said load unit and each of series interrupter groups.

7. A DC interrupting apparatus according to claim 1, in which said DC interrupting unit includes a disconnecting switch connected between said DC interrupter section and said power source unit.

8. A DC interrupting apparatus according to claim 1, in which said load unit is comprised of a first inductance coil, a resistor connected in parallel with said first inductance coil, a second inductance coil magnetically coupled with said first inductance coil, and a load connected in series to said second inductance coil.

* * * * *